May 8, 1923.
A. N. LADIN
1,454,749
CONVERTIBLE BABY CARRIAGE RUNNER
Filed March 13, 1922   2 Sheets-Sheet 1
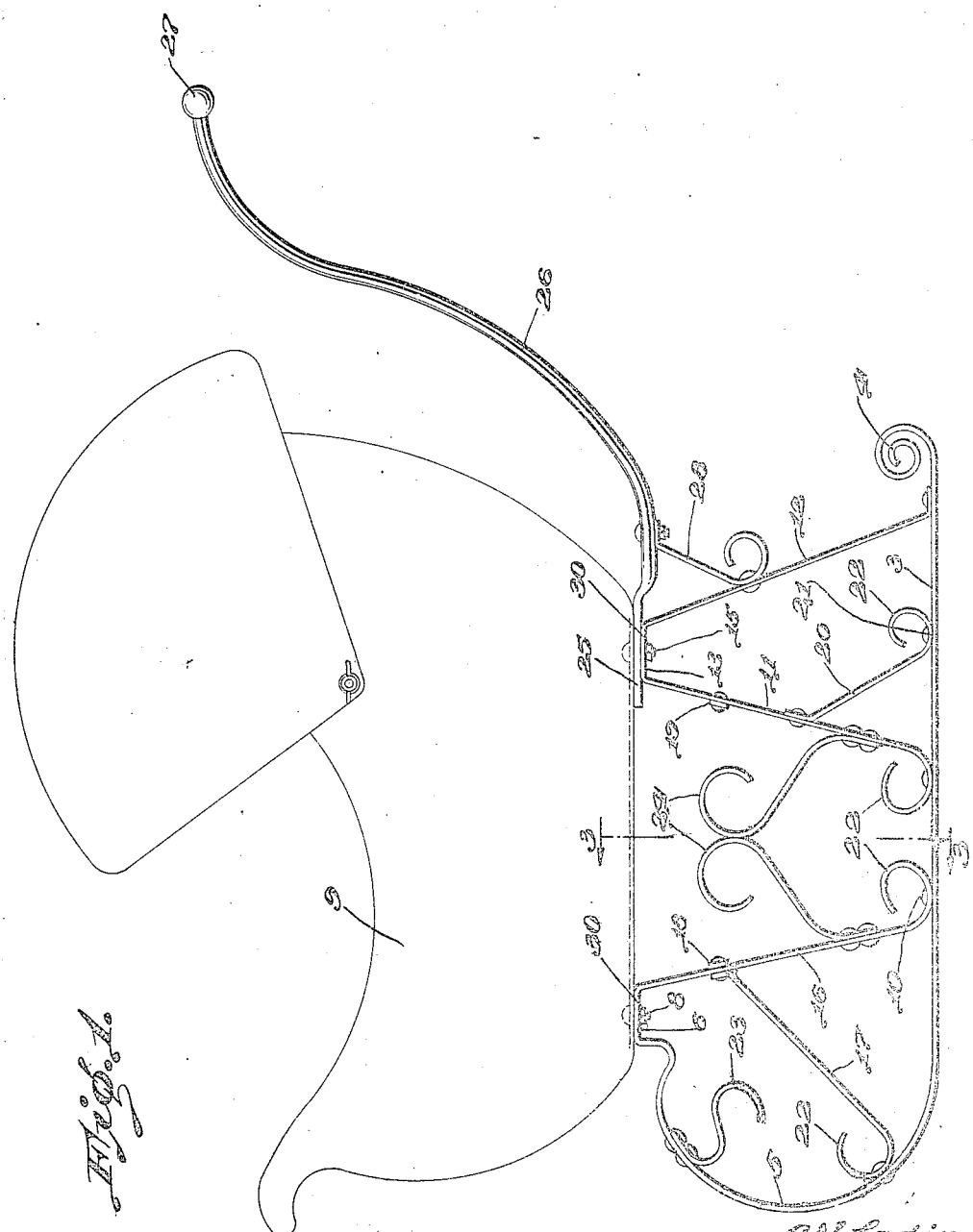

May 8, 1923.
A. N. LADIN
1,454,749
CONVERTIBLE BABY CARRIAGE RUNNER
Filed March 13, 1922 2 Sheets-Sheet 2
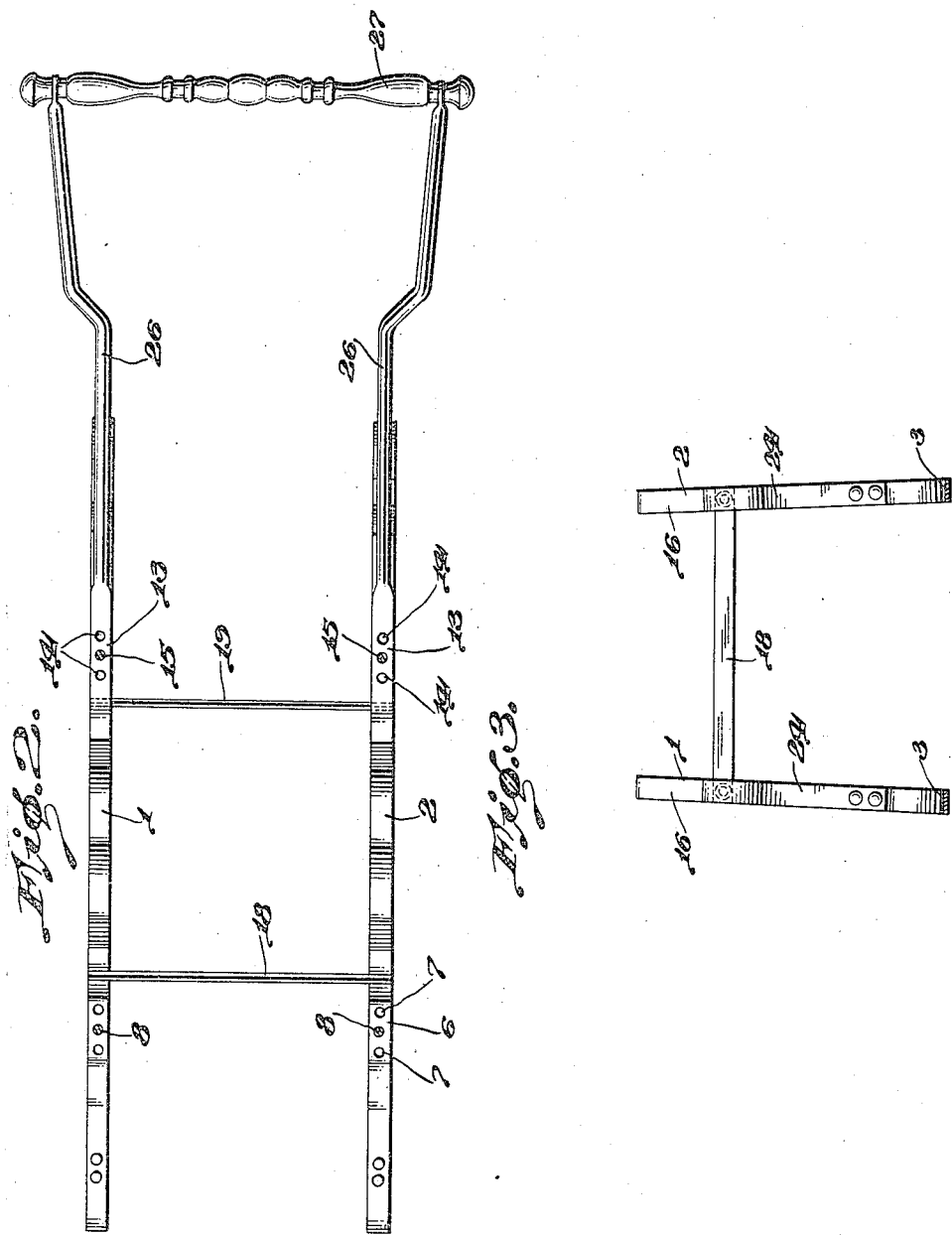

Patented May 8, 1923.

1,454,749

UNITED STATES PATENT OFFICE.

ABE N. LADIN, OF IRONWOOD, MICHIGAN.

CONVERTIBLE-BABY-CARRIAGE RUNNER.

Application filed March 13, 1922. Serial No. 543,493.

*To all whom it may concern:*

Be it known that I, ABE N. LADIN, a citizen of the United States, residing at Ironwood, in the county of Gogebic and State of Michigan, have invented new and useful Improvements in Convertible-Baby-Carriage Runners, of which the following is a specification.

This invention relates to a sled and more particularly to a combined baby carriage and sled, and an object of the invention is to provide a runner and handle structure which is designed for attachment to the basket or body of a baby carriage to permit the use of the basket or carriage in the winter time when there is comparatively heavy snow upon the ground. In certain sections of the country, the snowfall is comparatively heavy and there is snow upon the ground practically throughout the entire winter rendering baby carriages with wheels practically useless, and it is an object of this invention to provide a runner structure which may be attached to the basket or body of a baby carriage to facilitate its pushing or transportation over the snow and which will permit the use of the baby carriage body or basket with its comforts to the child.

Another object of this invention is to provide a runner structure as specified which may be attached to the carriage bodies or baskets of approved types of baby carriages, direct, eliminating the use of the chassis or running gear structure of the baby carriage, thereby providing a sled structure which is substantially the same height as the baby carriage with the wheels, and a runner structure which embodies sufficient resiliency to provide the necessary spring action for the basket, eliminating the use of springs.

Other objects of the invention will appear in the following detailed description taken in connection with the accompanying drawing wherein:

Fig. 1 is a side elevation of the improved sled structure.

Fig. 2 is a top plan of the runner.

Fig. 3 is a vertical section on the line 3—3 of Fig. 1.

Referring more particularly to the drawings, the improved sled structure, which comprises the runner structures 1 and 2, both of which are similar in construction, and may be constructed of any suitable material preferably bar metal so as to provide an artistic runner structure as clearly shown in Fig. 1 of the drawings. The runners 1 and 2 each comprise a tread 3 the rear of which may be rolled as shown at 4 to provide an artistic appearance, while the forward end of the tread curves upwardly presenting a convex surface forwardly of the runner structure. At the upper end of the front curved portion 5 of the tread, the bar of which the tread is formed dips downwardly and extends upwardly then rearwardly providing a horizontal attaching portion 6 which is provided with a plurality of spaced perforations 7 adapted to receive the bolts 8 by means of which the ordinary type of springs are attached to the basket or body 9 of a baby carriage structure. The bar of metal of which the tread 3 is formed extends downwardly from the horizontal attaching portion 6 and is attached, as shown at 10 to the tread structure 3 to provide a supporting brace which cooperates with the braces 11 and 12 in supporting the baby carriage body or basket 9. The braces 11 and 12 form the legs of a substantially inverted U shaped member, the bight portion of which provides a horizontal attaching portion 13 which is provided with a plurality of openings 14 adapted to receive the bolts 15 which cooperate with the bolts 8 in attaching the body 9 to its running gear structure.

The downwardly extending bracing end 16 of the bar of which the tread 3 is formed is braced by a diagonal brace 17 which is attached to the front arcuate portion 5 and extends upwardly and rearwardly therefrom being attached to the bracing portion 16 intermediate its ends and in alignment with the connection of the transverse brace 18. The transverse brace 18 connects the runners 1 and 2 and they are further connected by a transverse connecting brace 19 which is attached to the brace 11. A diagonal brace 20 is attached to the brace 11 intermediate its ends and has its lower end rolled as shown at 21 and engaging against the upper surface of the tread 3. The terminals of the various braces may be rolled as clearly shown at 22 in the drawings to provide an artistic appearance to the runner structure which appearance is further augmented by sinuously curved bars 23 and 24 the latter of which are attached one to each of the braces 11 and 16 and curved inwardly having engagement substantially equi-distant of the braces.

The horizontal supporting portion 6 is positioned at a slightly higher elevation than the horizontal attaching portion 13, as clearly shown in Fig. 1 of the drawings, so as to permit the attachment of the flattened attaching ends 25 of the handles 26 to the runner structure and also to the carriage body or basket 9. The flattened attaching ends 25 rest upon the horizontal attaching portions 13 and engage against the under surface of the body, as clearly shown in Fig. 1 of the drawings. The handles 26, which are connected by an approved type of hand grip bar or rod 27 are braced from the braces 12 by diagonal braces 28 which are attached to the braces 12 and to the handles outwardly out of the flattened attaching portions 25.

As shown in Fig. 3 of the drawings the runners 1 and 2 diverge slightly from each other towards their lower or tread portions 3.

From the foregoing description taken in connection with the accompanying drawings it will be apparent that the improved runner structure may be attached to any baby carriage body or basket in lieu of the running gear structure of the baby carriage and permit use of the carriage in the winter as well as in the summer or warmer seasons thereby eliminating the necessity of purchasing a separate sled structure for use in winter, and that the improved runners may be attached to the baby carriage body or bed merely by the loosening of the four nuts 30 which are carried by the bolts 8 and 15 respectively and the retightening of the nuts upon the bolts after the nuts have been inserted through the proper openings 7 or 14 in the horizontal attaching portions 6 and 13 respectively.

It is, of course, to be understood that the invention may be constructed in other manners and the parts associated in different relations and, therefore, I do not desire to be limited in any manner except as set forth in the claim hereunto appended.

Having thus described my invention what I claim is:

The combination with a baby carriage body, bolts for attaching the body to a running gear structure, of sled runners, comprising treads having their forward ends curved upwardly and shaped to provide horizontal attaching portions adapted to receive said bolts, substantially U shaped bracing members attached to said treads and having upper horizontal attaching portions adapted to receive certain of said bolts, said treads extending downwardly from the horizontal attaching portions thereon to provide braces.

In testimony whereof I affix my signature.

ABE N. LADIN.